Inventor:
Clark A. Sumner

3,011,875
APPARATUS FOR PRODUCING AMMONIUM PHOSPHATE SOLUTIONS
Clark A. Sumner, Downey, Calif., assignor to Victor Chemical Works, a corporation of Illinois
Filed Mar. 13, 1957, Ser. No. 645,700
5 Claims. (Cl. 23—259.1)

This invention relates to an improved process and apparatus for the manufacture of ammonium phosphate solutions.

The term "ammoniacal reactant" hereinafter refers to ammonia in gaseous, liquid or aqueous form.

Dilute solutions of ammonium phosphate may be satisfactorily prepared by simply admixing an ammoniacal reactant, phosphoric acid and water in a reaction chamber.

This procedure for preparing dilute solutions is not suitable for the production of highly concentrated solutions of ammonium phosphate, such as fertilizer solutions, since the heat of ammonia hydration and the heat of reaction of the ammoniacal reactant with phosphoric acid causes the violently exothermic reaction mixture to boil and bubble. The excessive heat liberated by the use of concentrated reactants causes considerable loss of ammonia vapor and subjects the reaction chamber to destructive vibration and deterioration.

My invention contemplates an improved process and apparatus for reacting any desired concentration of ammoniacal reactant and phosphoric acid to produce fertilizer solutions of a predetermined concentration or composition without the loss of a significant amount of the ammoniacal reactant while, at the same time, minimizing the destructive effects of the reaction on the apparatus.

My process, which provides for the production of concentrated ammonium phosphate solutions without significant loss of ammonia vapor, comprises: introducing the ammoniacal reactant and phosphoric acid under superatmospheric pressure into a reaction chamber that is positioned in a reservoir which contains water or ammonium phosphate solution; discharging the ammonium phosphate reaction product, beneath the surface of the liquid contents of the reservoir, from the chamber in the form of a thin liquid film or sheet; and removing ammonium phosphate solution from the reservoir.

In the accompanying diagrammatic drawings, in which a few of the embodiments of my invention are illustrated:

Figure 1:
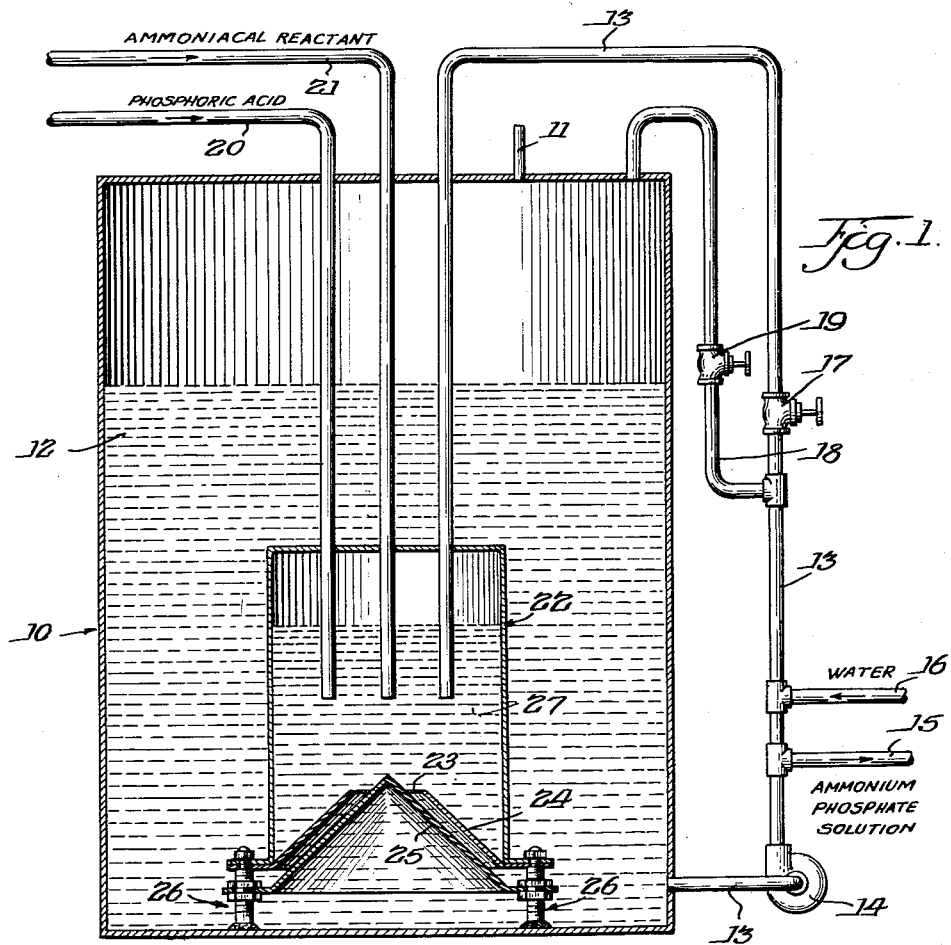
FIGURE 1 is a longitudinal sectional view of my apparatus showing one embodiment of my reaction chamber and baffle plate.

Referring now to the details of the embodiment of my invention shown in the drawings, FIGURE 1 shows apparatus for producing ammonium phosphate solutions, which comprises: a cylindrical reservoir 10 having a vent 11; a cylindrical reaction chamber 22, positioned in the reservoir 10, having a frusto-conical closed bottom 24 with a circular central opening 23; a conical baffle plate 25 positioned in spaced relationship to the opening 23 and bottom 24 of the reaction chamber 22; conduit means for introducing the reactants and, if desired, ammonium phosphate solution and/or water into the reaction chamber 22; and conduit means for withdrawing ammonium phosphate solution from the reservoir 10. The distance between baffle plate 25 and the bottom 24 of reaction chamber 22 may be varied by means of several adjusting assemblies 26. The adjusting assemblies 26 may also be used to position the reaction chamber 22 and baffle plate 25 off the bottom of reservoir 10.

Placement of the reaction chamber 22 and baffle plate 25 above the bottom of the reservoir 10 serves to dissipate the noise and vibrations induced by the reaction occurring in chamber 22.

Ammonium phosphate reacting solution produced in the reaction chamber 22 shown in FIGURE 1 is discharged from the chamber through circular opening 23 in the bottom wall 24 into the annular, frusto-conical, film-forming discharge chamber formed directly between the adjacent outer surfaces of the baffle plate 25 and the bottom wall 24. Although the initiation of the reaction between the ammoniacal reactant and phosphoric acid occurs in the reaction chamber 22, the reaction essentially occurs in the film-forming chamber.

These extended adjacent surfaces which form the film-forming chamber are spaced a short distance apart so as to provide an annular, frusto-conical discharge chamber that causes the ammonium phosphate solution discharged therefrom to enter the reservoir 10 in the form of a thin film of reacted ammonium phosphate. The sheet-like stream or film of ammonium phosphate solution in the film-forming discharge chamber should have a minimal cross-sectional area closest to the entrance of said discharge chamber of at least 4 in.$^2$ and a volume of at least 20 in.$^3$. The minimal cross-sectional area of the discharge chamber shown in FIG. 1 is at the apex of conical baffle plate 25. By discharging ammonium phosphate solution in the form of a film, large ammonia vapor bubbles formed in the chamber 22 are broken up; this serves to inhibit the escape of ammonia from the reaction chamber 22, causes the ammonia to disperse in the film-forming chamber, as well as the reaction chamber, and have prolonged contact with the ammonium phosphate solution thereby increasing the nitrogen content of the reaction solution, and effects a rather smooth dissipation of reaction energy. Thus, the essential reaction between the ammoniacal reactant and phosphoric acid occurs in the film-forming chamber.

During the generation of ammonium phosphate solution in chamber 22, ammonia vapor from the reacting solution 27 tends to fill the confines of the space formed between the top of the reacting solution 27 and chamber 22. This provides an atmosphere of ammonia above the solution 27.

Once the ammonium phosphate solution generated in the film-forming chamber and reaction chamber 22 is discharged in the form of a film from the discharge chamber into the liquid contents of reservoir 10, ammonium phosphate may be withdrawn from the reservoir as a product through conduits 13 and 15. If desired, a portion of the ammonium phosphate solution withdrawn from the reservoir 10 may be recirculated into the reaction chamber 22 through conduit 13 so as to help maintain suitable pressure in reaction chamber 22, as well as cool and dilute the reacting solution 27. The recirculation of ammonium phosphate solution is usually desirable when liquid ammonia, rather than aqua ammonia, is used as the ammoniacal reactant.

The reservoir 10 serves as a storage tank for the ammonium phosphate solution 12. Stored solution may be withdrawn as a product and/or recirculated into reaction chamber 22. In addition, the liquid in the reservoir 10 produces back-pressure against which the freshly generated ammonium phosphate solution in the film-forming discharge chamber must be discharged. When the superatmospheric pressure in the discharge chamber is 5 to 30 p.s.i. in excess of the back-pressure exerted by the liquid in reservoir 10, generated ammonium phosphate film may be satisfactorily discharged from the film-forming discharge chamber.

When ammonium phosphate solution is produced in a batchwise manner with the apparatus shown in FIGURE 1, a predetermined amount of water is fed to reservoir 10 through conduits 16, 13 and 18. The pump 14 is then actuated so that water may be then withdrawn from the reservoir 10 and pumped into the chamber 22 through conduit 13. A predetermined concentration of phosphoric acid (20% to 115% $H_3PO_4$ equivalent), followed by a predetermined concentration of ammoniacal reactant, are then pumped under pressure and at controlled flow rates through conduits 20 and 21, respectively, into the reaction chamber 22. The flow rate of the ammoniacal reactant should substantially correspond to the flow rate of phosphoric acid at the desired nitrogen to $P_2O_5$ ratio. The phosphoric acid, ammoniacal reactant and, if desired, recirculated ammonium phosphate solution are introduced into the reaction chamber 22 at a sufficient pressure to enable ammonium phosphate solution to flow in a sheet-like stream or film from the film-forming discharge chamber into the contents of reservoir 10. Phosphoric acid and ammoniacal reactant are continuously introduced into the reaction chamber 22 until the required amounts have been introduced to convert the solution 12 in reservoir 10 to a uniform solution of the desired nitrogen and $P_2O_5$ formulation.

Should it be desirable to operate on a continuous basis, it is only necessary to continue the introduction of the ammoniacal reactant, phosphoric acid and the calculated amount of water and/or recycled ammonium phosphate solution at rates necessary to produce ammonium phosphate solution having the desired concentration and nitrogen to $P_2O_5$ ratio. Ammonium phosphate solution 12 in the reservoir 10 should be continually withdrawn from the reservoir 10 at a rate corresponding to the rate of introduction of new reactants into the reaction chamber 22.

The process has consistently been operated with ammonia losses of less than 0.1% of the total ammonia employed when the ammoniacal reactant and phosphoric acid have 5–9% nitrogen and 15–26% $P_2O_5$, respectively.

It is also possible, and some times preferable, to dilute the ammoniacal reactant and/or phosphoric acid with a predetermined amount of water and react the diluted solutions of reactants without separately adding water to the reaction chamber 22.

Water and/or recycled ammonium phosphate solution may be fed through conduit 13 into the reaction chamber 22 by closing valve 19 and opening valve 17. When valve 17 is closed and valve 19 is opened, water and/or recycled ammonium phosphate solution may be fed to reservoir 10.

*Example I*

One gallon of ammonium phosphate fertilizer solution having a 5–15–0 formula (i.e., 5% nitrogen and 15% $P_2O_6$ analysis) may be produced by introducing 2.50 lbs. of aqueous ammonia (20% nitrogen), 2.75 lbs. of phosphoric acid (75% phosphoric acid) and 4.45 lbs. of water into the reaction chamber.

The film formed in the film-forming chamber defined between the bottom of the reaction chamber and the baffle plate should have at least ⅛ in.² cross-sectional area and a volume of at least 1 in.³ for every gallon of 75% $H_3PO_4$ added per minute to the reaction chamber.

The pressure of the liquid in the film-forming discharge chamber should exceed the pressure of the liquid in the reservoir by 5 to 30 p.s.i. so that the ammonium phosphate film in the discharge chamber may be properly ejected into the reservoir.

*Example II*

Ammonium phosphate having a formula 8–24–0 was prepared in the following manner.

2,095 gallons of water were added to a commercial reactor positioned in a reservoir of 10′ diameter x 20′ high (12,000 gallons capacity). Of this amount, 483 gallons were later lost as steam. This vented steam had only a barely detectable odor of ammonia.

With the recirculation pump running, 75% phosphoric acid (54.5% $P_2O_5$) was displaced by air from a tank truck through a rotameter at 25 g.p.m. into the reactor. There was a total of 37,970 pounds of acid in a tank truck to be used in this batch. Following the start of the acid flow, aqua ammonia (20.6% N) was pumped from a storage tank through a rotameter at 35 g.p.m. into the reactor. To make up the indicated formula, 4,450 gallons of aqua ammonia were needed. The recirculation pump was in operation during this entire operation. After one hour 55 minutes, all of the phosphoric acid had been consumed from the tank truck. At this time there still remained 600 gallons of "aqua" to be added. Without varying the flow rate, all of the aqua was charged into the reactor in an additional twenty minutes, for a total reaction time of two hours fifteen minutes. A total of 86,000 pounds or 8,200 gallons of neutral ammonium phosphate solution was made; on analysis it was found to have an actual value of 7.9–24.2–0 and a pH of 6.5 at 24° C. and a Baumé of 29.8 at 24° C.

Figure 2:
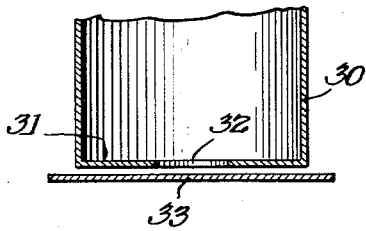
FIGURE 2 is a fragmentary sectional view showing a second embodiment of my reaction chamber and baffle plate.

FIGURE 2 shows the lower portion of a cylindrical reaction chamber 30 having a bottom wall 31 with an opening 32 therein. A circular baffle plate 33 is shown spaced a short distance from the bottom wall 31 and opening 32 so that ammonium phosphate reacting solution discharged through opening 32 will form a film within the confines of the annular film-forming discharge chamber formed between the bottom wall 31 and baffle plate 33.

Figure 3:
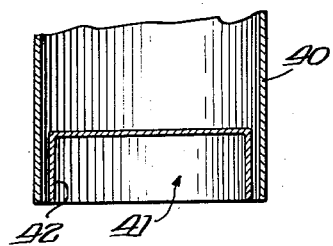
FIGURE 3 is a sectional view, similar to FIGURE 2, showing a third embodiment of my reaction chamber and baffle plate.

FIGURE 3 shows a cylindrical reaction chamber 40 having an opening and a circular baffle plate 41 having a cylindrical side wall 42 positioned in said opening. The annular space formed between chamber 40 and the side wall 42 of baffle plate 41 constitutes the film-forming discharge chamber.

Regardless of the particular configuration of the reaction chamber and baffle plate and their spatial relationship to each other, they must cooperatively provide at least one film-forming discharge chamber capable of producing a thin film of ammonium phosphate solution. If desired, a plurality of film-forming discharge chambers may be formed by providing a plurality of baffle plates adjacent an opening and/or openings in the reaction chamber. Regardless of the number of film-forming discharge chambers used in conjunction with a single reaction chamber, the minimal cross-sectional area and the volume of the film formed therein must be at least 4 in.² and at least 20 in.³, respectively. The minimal cross-sectional area of the film in a single continuous film-forming chamber is the smallest cross-sectional area nearest the entrance of the film-forming chamber; the volume of such a chamber is determined by the distance from the entrance to the exit of the discharge chamber and the spatial distance between the baffle plate and reaction chamber. When the ammonium phosphate solution leaves the reaction chamber through a plurality of film-forming chambers in the form of reacted ammonium phosphate, the cross-sectional area will be the total of the minimal cross-sectional area of each discharge chamber; and the volume will be the total of the volume of each discharge chamber.

In the accompanying claims, the term "film-forming discharge chamber" is intended to include a single discharge chamber as well as a plurality of discharge chambers used in conjunction with a single reaction chamber. Similarly, the term "baffle plate" hereinafter refers to a single plate or a plurality of plates.

Reference to "volume" and "minimal cross-sectional area" in the claims refers to the volume and minimal cross-sectional area closest to the entrance of the discharge chamber, respectively, of a single discharge chamber when only one discharge chamber is used in conjunction with a single reaction chamber, or the total volume and the total of the minimal cross-sectional areas of a plurality of discharge chambers used in conjunction with a single reaction chamber.

The shape of the reservoir 10 and reaction chamber may be varied from the configurations shown in the accompanying drawings. However, it is desirable that the volume of the reservoir be much greater than the volume of the reaction chamber.

As stated above, it is desirable to position the film-forming discharge chamber above the bottom of the reservoir. For example, the discharge chamber may be positioned above the bottom of the reservoir a distance which is 0.05 to two times the diameter of the reservoir.

While acid-resistant materials such as stainless steels, "Dur-iron" or Monel metal may be used in fabricating the reservoir and reaction chamber, one of the major advantages of this apparatus and process is this, that ordinary iron or steel may be used in the equipment (except for phosphoric acid pump and pipe) without the excessive corrosion heretofore noted in ammonium phosphate production.

The foregoing detailed description has been given for clearness of understanding only, and no unnecessary limitations should be understood therefrom, as modifications will be obvious to those skilled in the art.

I claim:

1. Apparatus for the production of ammonium phosphate solutions comprising: a vessel for selectively retaining liquids, a reaction mixture tank positioned in said vessel in spaced relationship thereto, said tank having its bottom in the lower half of and spaced adjacent to the bottom of said vessel and said bottom of said tank being immersed in said liquids, said bottom of said tank including a discharge opening therein, a baffle plate substantially parallel to the portion of the bottom of said tank defining said discharge opening, said baffle plate operatively associated with said discharge opening, said baffle plate being spaced from said portion of the bottom of said tank and defining therebetween a thin, film-forming discharge chamber communicating with said discharge opening, said discharge chamber serving as a nozzle to restrict the flow of fluid from said tank, fluid inlet means operatively communicating with said tank for introducing water, phosphoric acid and ammoniacal reactant into said tank and conduit means operatively communicating with said vessel for removing liquid ammonium phosphate reaction product therefrom.

2. The apparatus set forth in claim 1 wherein said film-forming discharge chamber has a minimal cross-sectional area of at least 4 in.$^2$ and a volume of at least 20 in.$^3$.

3. Apparatus for the production of ammonium phosphate solutions comprising: a vessel for selectively retaining liquids, a reaction mixture tank positioned in said vessel in spaced relationship thereto, said tank having an upwardly and inwardly tapered bottom defining a central discharge opening positioned in proximity to the bottom of said vessel; a baffle plate positioned between the bottoms of said vessel and said tank, said baffle plate being substantially parallel to said tapered bottom and operatively associated with said discharge opening, said baffle plate and said tapered bottom of said tank forming a thin, film-forming discharge chamber therebetween communicating with said discharge opening and serving as a nozzle to restrict the flow of fluid from said tank into said vessel, fluid inlet means operatively communicating with said tank for introducing water, phosphoric acid and ammoniacal reactant into said tank; and conduit means operatively communicating with said vessel for removing liquid ammonium phosphate reaction product therefrom.

4. Apparatus for the production of ammonium phosphate solutions comprising: a vessel for selectively retaining liquids, a reaction mixture tank positioned in said vessel in spaced relationship thereto, said tank having a frusto-conical bottom defining a circular central discharge opening positioned in proximity to the bottom of said vessel; a conical baffle plate positioned between said frusto-conical bottom of said tank and said vessel, said conical baffle plate being substantially parallel to said frusto-conical bottom and operatively associated with said discharge opening, said conical baffle plate and said frusto-conical bottom forming a thin, film-forming discharge chamber therebetween communicating with said discharge opening and serving as a nozzle to restrict the flow of fluid from said tank into said vessel, fluid inlet means operatively communicating with said tank for introducing water, phosphoric acid and ammoniacal reactant into said tank; and conduit means operatively communicating with said vessel for removing liquid ammonium phosphate reaction product therefrom.

5. Apparatus suitable for the production of ammonium phosphate solutions and having a nozzle and feeding chamber positioned in but in spaced relation to a vessel comprising: a high velocity, thin film-forming, elongated, liquid reaction nozzle essentially defined by adjacent, spaced apart, operatively associated, substantially parallel surfaces having a minimal cross-sectional area of at least 4 in.$^2$ and a volume of at least 20 in.$^3$; said nozzle having a narrow, elongated liquid flow path; a liquid feeding chamber for selectively retaining and supplying liquid having as liquid outlet means, said nozzle; the volume of said liquid feeding chamber being substantially greater than that of the nozzle; said nozzle and feeding chamber being positioned inside and in spaced relation in proximity to the bottom of a vessel for selectively retaining liquids; said vessel having a substantially greater volume than the combined volumes of the nozzle and feeding chamber; said nozzle having its outlet positioned near the bottom of the vessel; said chamber and vessel having liquid inlet means and liquid outlet means, respectively; said apparatus being capable of continuously operating in steps comprising feeding liquid into said chamber, ejecting liquid from said chamber directly into the nozzle, forming a thin film of liquid in said nozzle, ejecting said film from said nozzle at a high velocity and under superatmospheric pressure directly into the confines of the vessel near the bottom thereof, and selectively withdrawing the liquid ejected by the nozzle from the confines of the vessel through the vessel outlet.

References Cited in the file of this patent

UNITED STATES PATENTS

| | | |
|---|---|---|
| 1,872,024 | Bates | Aug. 16, 1932 |
| 2,037,706 | Curtis | Apr. 21, 1936 |
| 2,047,394 | Siems | July 14, 1936 |
| 2,078,627 | Block et al. | Apr. 27, 1937 |
| 2,363,834 | Crater | Nov. 28, 1944 |
| 2,378,138 | Gaylor | June 12, 1945 |
| 2,502,490 | Sweet | Apr. 4, 1950 |
| 2,656,266 | Calmeyer | Oct. 20, 1953 |
| 2,770,540 | Vierling | Nov. 13, 1956 |
| 2,792,286 | Wordie et al. | May 14, 1957 |
| 2,810,630 | Herele | Oct. 22, 1957 |
| 2,814,556 | Christoffel | Nov. 26, 1957 |